United States Patent Office 3,445,402
Patented May 20, 1969

3,445,402
HIGH TEMPERATURE CATALYSTS
Ronald E. Reitmeier, Middletown, Ky., assignor to Catalysts & Chemicals Inc., Louisville, Ky., a corporation of Delaware
No Drawing. Filed Dec. 30, 1964, Ser. No. 422,445
Int. Cl. B01j *11/54;* C10g *35/06*
U.S. Cl. 252—466                                                   6 Claims

ABSTRACT OF THE DISCLOSURE

A high temperature reforming catalyst, and its method of production, consisting essentially of an Iron Group metal oxide in a pre-set calcium aluminate cement which is treated with 20 p.s.i.g. to 700 p.s.i.g. of steam at 258° F. to 506° F. from two to eight hours to improve crush strength.

---

This invention relates to catalysts which are to be used under high temperature conditions. In a more specific aspect, the invention relates to catalysts employed in reforming, hydroforming, and similar high temperature operations, where iron, cobalt and nickel oxides are used on alumina carriers.

Catalysts employing calcined alumina bases possess a number of significant advantages for use in such operations as reforming. Desirable alumina bases contain controlled amounts of amorphous and crystalline forms of alumina. The amorphous form generally decreases with increasing temperature. Hence, it is difficult to maintain the catalytic material in amorphous form. As a consequence, the surface area is dependent almost entirely on the size, shape and microporosity of the catalyst. Clays have been employed as carriers but they are not entirely satisfactory from the standpoint of strength. At reforming temperatures, refractory materials such as calcium aluminates, or calcium aluminate cements, would be desirable.

As set forth in U.S. 3,001,952, hydraulic cements, both portland cement and calcium aluminate cements have been found to be effective catalyst components. Cured calcium aluminate cements per se, however, do not possess the strength of portland cements. At elevated temperatures such as at reforming temperatures hydrated calcium aluminates seem to undergo a chemical change, losing some of their water of hydration, which results in reduced hydraulic strength. This reduction in strength must be overcome in order that the catalyst withstand the effects of vibration, process-stream turbulence, transient bed-lifting, occasional impingement by other solid particles and similar disturbances.

One solution to the strength problem in calcium aluminate cement carriers is to combine the calcium aluminate with alumina or with a clay containing alumina such as kaolin. This also does not completely solve the problem. At temperatures encountered in reforming, if for some reason an oxidizing atmosphere is created, the active metal in the catalyst, being oxidized, combines with alumina in a spinel structure.

Minerals such as spinel $MgOAl_2O_3$ are mixed oxides in which the oxide ions are arranged in a cubic array. The spinel structure is characterized by an oxygen framework with tetrahedral and octahedral interstices. There is an enormous number of mixed oxides of this type $M'OM''_2O_3$ where $M'$ and $M''$ are divalent and trivalent ions, respectively. Examples are $CoO \cdot Al_2O_3$, $NiO \cdot Al_2O_3$, $FeO \cdot Al_2O_3$, $FeOCr_2O_3$ and the like. The formation of the crystalline spinel structure results in a color change which is readily seen in the catalyst. The catalyst changes from its original grayish color to blue-green. More important, from the spinel structure it can be seen that spinel formation also ties up the active metal. This leads to coking and greatly reduces the life of the reforming catalyst, depending on the quantity of gamma alumina present.

By the practice of this invention, a calcium aluminate cement catalyst is provided which is virtually devoid of spinel forming alumina and other trivalent spinel forming metals, but which nevertheless has high mechanical strength and is able to withstand attritional effects and vibrational disturbances. By virtually is meant that some gamma alumina can be tolerated, say, one percent uncombined alumina, since the quantity of spinel formed would be small. By calcium aluminate cement is meant any of the well-known high alumina or Lumnite cements consisting primarily of calcium aluminates such as $C_{12}A_7$, CA, $C_3A$, $C_3A_5$, and $C_5A_3$. Generally tricalcium aluminate $C_3A$, will be present. Such calcium aluminate cements include the various calcium aluminate compounds such as calcium monoaluminate $(CaO \cdot Al_2O_3)$, tricalcium aluminate $(3CaO \cdot Al_2O_3)$, pentacalcium trialuminate $(5CaO \cdot 3Al_2O_3)$ and the like as well as cements such as the high alumina cements containing calcium aluminates and minor amounts, say less than twenty-five percent, of calcium silicate. Desirable calcium aluminate cements are available commercially, for instance Lumnite, and CA-25 which is virtually a mixture of monocalcium aluminate and pentacalcium trialuminate (79 percent alumina, 18 percent lime and 3 percent other oxides by analysis). Any alumina as such, if present at all in these refractory cements is present as non-spinel forming alpha alumina due to their high temperature manufacture.

It is well known that set cement, either portland or calcium aluminate, when reground and gauged again with water will set a second time. The strength properties of such re-formed compositions will, however, be inferior to those of the original set cements. In accordance with this invention it has been found that calcium aluminate cement catalyst pellets having improved strength properties and attrition resistance can be made by steam treating the pellets subsequent to a hydraulic set at ordinary temperature. By ordinary temperature is meant the temperature in a catalyst plant area where the cement is made, i.e. room temperature. This temperature will generally be 50° F. to 80° F. and will generally not exceed 100° F.

Without being limited to any theory, it appears that even after very prolonged periods, hardened calcium aluminates still possess unhydrated cores. It is believed that subsequent treatment with steam brings about hydrothermal changes in these cores. Thus, after calcium aluminate cement has set at ordinary temperature its compressive and tensile strengths will not increase. It will never get any stronger. Steam hydration subsequent to the initial set, however, appears to bring about a second set reaction which overshadows the first. Strong bonds formed result in a catalyst whose compressive and tensile strengths far exceed those of the originally cured cement catalyst. It is unnecessary to incorporate kaolin, as was done in U.S. 3,001,952, or gamma alumina, in this calcium aluminate cement mass.

When subjecting the calcium aluminate catalyst particles to subsequent steam hydrothermal treatment, it is desirable to employ saturated steam under a pressure of at least twenty pounds (gauge). The temperature will be 258° F. The catalyst is subjected to steam until the particles reach steam temperature and are then heated for an additional period sufficient to confer on the catalyst particles a dead weight load (DWL) crush strength of at least 74 pounds. The treatment can be for a period sufficient to permit development of maximum strength. With atmospheric steam (212° F.) and 15 p.s.i.g. steam (250° F.) the treating period is unduly long. The particles are brought to steam temperature and after an additional four hours the DWL crush strength is still less than 60 pounds. The length of the hydrothermal treatment also depends upon the size of the catalyst particles. And for any given catalyst size it is preferred to use a steam pressure (and its accompanying temperature) such that after the catalyst particles reach steam temperature they will have the DWL crush strength over 74 pounds in two to four hours and preferably not over eight hours. With a constant steam treating period, steam pressure is increased as the particle size is increased. Steam pressure will normally be in the range of 20 p.s.i.g. (258° F.) to 700 p.s.ig (506° F). However, even higher pressures can be used The catalysts of this invention can be used in a variety of high temperature contacting operations where iron, cobalt, and nickel are used The process will depend on the active metal used and upon the surface area. The invention permits the use of spinel-forming divalent metals, and in general, excellent catalysts can be obtained by incorporating one or more of the oxides of these metals in the calcium aluminate cement or on the surface thereof. In fact, due to the nature of the catalyst base, in some instances pulverized metal, such as powdered nickel, can be used. The optimum concentration of the active metal generally will depend upon the contact operation or process carried out, and on such conditions as temperature, space velocity, etc. Usually, the catalyst will contain from about 0.1 to 40 percent metal by weight based on the catalyst base. A preferred catalyst is a reforming catalyst containing 20 to 30 weight percent nickel.

Two methods can be employed for combining the metal, metal oxide or metal salt, and such materials, if used, as lubricants, compositions to lower the density, promoters, etc., with the calcium aluminate cement. The preferred method is to dry mix and mill the entire catalyst recipe, except graphite; then add water and graphite, and let it stand for one to twenty-four hours. The catalyst is subsequently granulated, pelletized, set and subsequent to said set is subjected to the hydrothermal steam treatment in one or more stages, for a period sufficient to confer strength properties on the pellets. The other method is to form or set the calcium aluminate cement in any shape. This is then ground, milled with the catalyst ingredients and gauged again with water to a second set. Steam treating of these pellets results in extremely strong and attrition resistant pellets. The formation of the catalysts contemplated herein, as well as other features of the invention, can perhaps best be shown by illustrative examples.

Example 1.—Catalyst composition

| | Percent |
|---|---|
| NiO | 22 |
| Calcium aluminate cement (CA-25) | 44 |
| Rework (ground dry mix–33 percent NiO; 67 percent CA-25) | 33 |
| Graphite | 1 |

Catalyst preparation

Using the above formula sufficient ingredients were used for a 251 pound batch. In a mixer, 100 pounds of calcium aluminate cement, 83 pounds of calcined nickel carbonate and 58 pounds of calcined rework were dry mixed for five minutes. Fifty to seventy pounds of water were then added to the dry ingredients and mixing was continued for five more minutes. The graphite (2.5 pounds) was added to the slurry and mixing continued for an additional five minutes. The mix was then poured out in a layer two to three inches thick and allowed to set until firm enough to granulate and flow properly through the tableting machine (1 hour to 24 hours depending on room temperature). After this initial set, the material was granulated using a 6 to 8 mesh screen and fed to a Stokes tableting machine to form 5/8" x 5/8" rings with a 1/4" hole in the center. The rings were allowed to set at room temperature 6 hours to a week and transferred to an autoclave and steam treated with saturated steam at 300° F. (53 p.s.i.g.) for six hours. The rings were then calcined at 650° F. for about six hours. The DWL crush strength of the rings averaged 88 pounds.

Example 2

To illustrate the effect of the steam treatment, five batches of the foregoing were made into 5/8" x 5/8" rings and treated with steam for six hours. The rings were subsequently calcined at 600° F. for six hours in each instance. Results in terms of DWL crush strength were as follows.

| Condition: | DWL strength (lbs.) |
|---|---|
| Stood 48 hours at room temp. (no steam treatment) | 46 |
| Atm (212 F. sat. steam) | 55 |
| 15 p.s.i.g. (250 F. sat. steam) | 60 |
| 30 p.s.i.g. (275 F. sat. steam) | 74 |
| 45 ps.i.g. (293 F. sat. steam) | 87 |
| 50 p.s.i.g. (298 F. sat. steam) | 89 |

It can be seen from the foregoing data that steam treatment in accordance with this invention greatly influences the crush strength. It is obvious that the steam treating temperature depends upon the pressure. Thus, any of the various pressures and corresponding temperatures which result in a crush strength of at least 74 can be used.

The effect of spinel formation is shown by the following reforming data. Methane leakage, indicating methane conversion, is given in the table. To determine conversion at various temperatures the unit was put on stream with natural gas and steam and the temperature was raised until reforming began. The temperature was then fixed at 1200° F. After one hour methane leakage was determined. The temperature was then raised to 1400° F. and the unit operated for an hour. Methane leakage under these conditions is given in the table. The process was repeated for 1600° F. Subsequently reforming was continued for 16 hours. Methane leakages for all of these temperatures taken as indicated are given in the following table.

TABLE

Process conditions:
450 cc. of 5/8" x 5/8" rings
Atmospheric pressure
500 CH₄ space velocity or 2,000 Theo H₂
Steam gas ratio —3.0
Calcination temperature, 600° F.

| Catalyst (percent) | Methane leakages before 16 hr. treatment at 1,600° F. | | | Methane leakages after 16 hr. treatment at 1,600° F. |
|---|---|---|---|---|
| | 1,200 | 1,400 | 1,600 | |
| 45 cement, 20 NiO, 35 Al₂O₃ | 5.5 | 1.4 | 1.6 | 5.8 |
| 73 cement, 20 NiO, 5 Al₂O₃, 2 SiO₂ | 5.6 | 1.4 | 0.5 | 0.5 |
| 65.5 cement, 20.0 NiO, 12.5 Al₂O₃, 2.0 SiO₂ | 6.4 | 0.8 | 0.2 | 0.3 |

The foregoing data shows that with calcium aluminate cements, methane leakage increases as the amount of spinel forming aluminum oxide is increased. Thus, after 16 hours at 1600° F. methane leakage is 5.8 percent when the catalyst contains 35 percent aluminum oxide. When the catalyst contains only 5 percent aluminum oxide methane leakage is only 0.5 percent. While 5 percent alumina is shown to be better than greater amounts at sixteen hours it is nevertheless detrimental considering the long catalyst life.

It will be apparent that there are various methods of treating the catalyst to achieve the improved strength property according to this invention. Hence various changes can be made without departing from the spirit of this invention. Such changes are deemed to be within the scope thereof.

What is claimed is:

1. A process for the preparation of a calcium aluminate cement catalyst having improved strength properties and attrition resistance which comprises hydraulically setting calcium aluminate cement containing no more than one percent uncombined alumina at room temperature, grinding the set cement to a powder, mixing the powder with 0.1 to 40 weight percent of a member selected from the group consisting of nickel oxide, iron oxide and cobalt oxide, forming pellets of the mix, and treating the pellets with steam at a pressure of 20 p.s.i.g to 700 p.s.i.g. and at the temperature corresponding thereto in the range of 258° F. to 506° F. for a period of time in the range of two to eight hours sufficient to bring their temperature up to steam temperature and to develop a DWL crush strength in the pellets of at least 74 pounds due to the resulting hydrothermal reaction.

2. A process for the preparation of a calcium aluminate cement catalyst having improved strength properties and attrition resistance which comprises mixing calcium aluminate cement in a catalyst recipe including 0.1 to 40 weight percent of a member selected from the group consisting of nickel oxide, iron oxide and cobalt oxide, and containing no more than one percent uncombined alumina, hydraulically setting the resulting calcium aluminate cement, grinding the set cement to a powder, forming pellets of the powder, and treating the pellets with steam at a pressure of 20 p.s.i.g. to 700 p.s.i.g. and at the temperature corresponding thereto in the range of 258° F. to 506° F. for a period of time in the range of two to eight hours sufficient to bring their temperature up to steam temperature and to develop a DWL crush strength in the pellets of at least 74 pounds due to the resulting hydrothermal reaction.

3. As a catalyst for reforming, hydroforming, and similar reactions conducted at temperatures at least as high as 1100° F., the aluminate cement catalyst prepared by the process of claim 2.

4. As a reforming catalyst, the catalyst of claim 3 consisting of 20 to 30 weight percent metal oxide.

5. The catalyst of claim 4 wherein the metal oxide is nickel oxide.

6. The catalyst of claim 4 wherein the metal oxide is iron oxide.

References Cited

UNITED STATES PATENTS

| | | | |
|---|---|---|---|
| 2,037,790 | 4/1936 | Ipatieff | 252—466 X |
| 2,038,566 | 4/1936 | Huettner et al. | 252—466 X |
| 2,825,700 | 3/1958 | Ashley et al. | 252—455 X |
| 2,897,160 | 7/1959 | Fleming et al. | 252—455 |
| 2,914,487 | 11/1959 | Hoffman | 252—455 |
| 3,256,207 | 6/1966 | Arnold | 252—455 |

DANIEL E. WYMAN, *Primary Examiner.*

P. M. FRENCH, *Assistant Examiner.*

U.S. Cl. X.R.

208—137; 252—463